US010777070B1

(12) United States Patent
Holder et al.

(10) Patent No.: US 10,777,070 B1
(45) Date of Patent: Sep. 15, 2020

(54) OCCUPANCY ALARM SYSTEM (71) Applicants: Diane Holder, Brampton (CA); Ainsworth Carter, Brampton (CA)

(72) Inventors: Diane Holder, Brampton (CA); Ainsworth Carter, Brampton (CA)

( * ) Notice: Subject to any disclaimer, the term of this patent is extended or adjusted under 35 U.S.C. 154(b) by 0 days.

(21) Appl. No.: 16/414,259

(22) Filed: May 16, 2019

(51) Int. Cl.
*G08B 21/24* (2006.01)
*B60R 21/015* (2006.01)
(Continued)

(52) U.S. Cl.
CPC .............. *G08B 21/24* (2013.01); *B60Q 9/00* (2013.01); *B60R 21/01534* (2014.10);
(Continued)

(58) Field of Classification Search
CPC ...... F01N 13/107; F01N 3/10; F01N 2410/00; F01N 9/00; F01N 2560/025; F01N 3/103; F01N 2560/08; F01N 2560/14; F01N 2590/11; F01N 2900/1602; F01N 3/021; F01N 3/101; F01N 3/2066; F01N 11/00; F01N 13/009; F01N 2430/02; F01N 3/20; F01N 11/005; F01N 13/00; F01N 13/04; F01N 13/087; F01N 2240/02; F01N 2240/36; F01N 2430/10; F01N 2560/027; F01N 2900/08; F01N 3/2013; F01N 3/2053; F01N 11/002; F01N 13/008; F01N 13/10; F01N 2240/16; F01N 2260/14; F01N 2330/06; F01N 2330/18; F01N 2560/20; F01N 2900/04; F01N 2900/0408; F01N 2900/0602; F01N 2900/1402; F01N 2900/1404; F01N 2900/1631; F01N 3/023; F01N 3/2026; F01N 3/22; F01N 3/2828; F02D 13/0257; F02D 41/26; F02D 13/0261; F02D 41/0007; F02D 41/0077; F02D 41/005; F02D 2041/001; F02D 13/0246; F02D 13/06; F02D 13/0249; F02D 41/123; F02D 41/042; F02D 41/1448; F02D 13/0234; F02D 41/0065; F02D 41/025; F02D 41/064; F02D 41/1454;
(Continued)

(56) References Cited

U.S. PATENT DOCUMENTS

5,525,977 A * 6/1996 Suman .................... B60R 25/00
340/4.4
5,793,291 A 8/1998 Thornton
(Continued)

*Primary Examiner* — Daniel Previl (57) ABSTRACT

An occupancy alarm system for warning a driver of vehicle occupancy includes an electronics module that is configured to couple to a vehicle, and which is operationally couplable to an electronic control unit (ECU) and an electrical circuit of the vehicle. The electronics module comprises a module transceiver and a plurality of sensors, which is configured to determine an occupancy status of the vehicle. A fob device that is retained by a driver who exits the vehicle comprises a fob receiver, which is GPS enabled, a fob transceiver, and a speaker. CPU programming code that is positioned on a CPU of the ECU enables the ECU to selectively actuate the module transceiver, based on occupancy status of the vehicle and a position of the driver relative to the vehicle, to communicate an alert signal to the fob device via the fob transceiver to alert the driver to the occupancy status.

15 Claims, 4 Drawing Sheets

(51) Int. Cl.
*G08B 3/10* (2006.01)
*B60Q 9/00* (2006.01)
*G08B 21/22* (2006.01)

(52) U.S. Cl.
CPC ...... *B60R 21/01542* (2014.10); *G08B 3/1025* (2013.01); *G08B 21/22* (2013.01)

(58) Field of Classification Search
CPC ............. F02D 13/0203; F02D 13/0276; F02D 41/062; F02D 13/0215; F02D 2200/0414; F02D 2200/0418; F02D 29/02; F02D 41/0087; F02D 41/221; F02D 9/08; F02D 13/0207; F02D 2013/0292; F02D 2200/0802; F02D 41/1475; F02D 13/0242; F02D 2041/0017; F02D 2041/002; F02D 2200/021; F02D 2200/0406; F02D 2200/602; F02D 23/00; F02D 41/0002; F02D 41/029; F02D 41/08; F02D 41/12; F02D 41/14; F02D 41/1458; F02D 41/1498; F02D 13/0253; F02D 17/04; F02D 2041/0015; F02D 2041/0092; F02D 2041/2051; F02D 2041/225; F02D 2041/227; F02D 2041/228; F02D 2041/281; F02D 2041/389; F02D 2200/0404; F02D 2200/06; F02D 2200/101; F02D 2200/503; F02D 2200/702; F02D 2250/14; F02D 41/0235; F02D 41/024; F02D 41/1439; F02D 41/1441; F02D 41/1445; F02D 41/1446; F02D 41/1456; F02D 41/1494; F02D 41/18; F02D 41/22; F02D 41/222; F02D 41/3005; Y02T 10/144; Y02T 10/18; Y02T 10/47; Y02T 10/22; Y02T 10/26; Y02T 10/146; Y02T 10/24; Y02T 10/20; Y02T 10/42; Y02T 10/46; Y02T 10/642; Y02T 10/7005; F02M 26/14; F02M 26/20; F02M 26/53; F02M 26/04; F02M 26/05; F02M 26/07; F02M 26/43; F02M 26/42; F02M 35/10222; F02M 26/22; F02M 26/44; F02M 35/10268; F02M 35/104; F02M 26/06; F02M 26/09; F02M 26/15; F02M 26/17; F02M 26/23; F02M 26/38; F02M 26/41; F02M 26/52; F02M 35/10209; F02M 2025/0845; F02M 25/0809; F02M 25/0836; F02M 25/089; F02M 26/30; F02M 35/10255; F02B 25/145; F02B 37/00; F02B 37/18; F02B 37/183; F02B 39/10; F02B 37/025; F02B 29/08; F02B 37/04; F02B 2023/085; F02B 31/085; F02B 37/225; B60W 10/20; B60W 2420/42; B60W 10/06; B60W 2420/52; B60W 30/18163; B60W 20/00; B60W 20/15; B60W 2550/10; B60W 30/09; B60W 30/18145; B60W 50/0098; B60W 10/04; B60W 10/08; B60W 10/18; B60W 10/184; B60W 2050/143; B60W 2520/10; B60W 2540/04; B60W 2540/18; B60W 2540/20; B60W 2550/308; B60W 2600/00; B60W 2710/18; B60W 2710/20; B60W 30/165; B60W 40/114; B60W 50/14; B60W 10/119; B60W 10/14; B60W 10/188; B60W 10/24; B60W 10/30; B60W 2040/0818; B60W 2040/0881; B60W 2050/0006; B60W 2050/046; B60W 2050/146; B60W 20/20; B60W 2300/125; B60W 2300/14; B60W 2300/18; B60W 2400/00; B60W 2510/186; B60W 2510/188; B60W 2510/20; B60W 2510/305; B60W 2520/22; B60W 2520/263; B60W 2540/26; B60W 2550/141; B60W 2550/146; B60W 2550/20; B60W 2550/30; B60W 2550/306; B60W 2550/402; B60W 2550/408; B60W 2710/125; B60W 2710/182; B60W 2710/207; B60W 2720/106; B60W 2720/403; B60W 2750/308; B60W 2750/40; B60W 30/02; B60W 30/0953; B60W 30/0956; B60W 30/12; B60W 30/143; B60W 30/16; B60W 30/18109; B60W 30/18127; B60W 30/18154; B60W 30/18172; B60W 30/1888; B60W 40/04; B60W 40/09; B60W 40/105; B60W 50/00; F02N 19/004; F02N 11/0822; F02N 11/0848; F02N 2200/024; F02N 2200/063; F02N 2200/122; F02N 11/00; F02N 11/0814; F02N 11/0825; F02N 11/0829; F02N 11/0837; F02N 11/084; F02N 11/0862; F02N 11/0866; F02N 11/087; F02N 11/10; F02N 11/101; F02N 11/108; F02N 2011/0885; F02N 2200/022; F02N 2200/04; F02N 2200/06; F02N 2200/061; F02N 2200/0801; F02N 2200/0808; F02N 2200/102; F02N 2200/104; F02N 2200/123; F02N 2200/125; F02N 2250/02; G01N 27/4074; G01N 33/0042; G01N 27/4067; G01N 27/419; G01N 27/41; G01N 27/123; G01N 27/30; G01N 27/304; G01N 27/4065; G01N 27/407; G01N 27/4071; G01N 27/4075; G01N 27/4162; G01N 27/49; G01N 33/006; G08G 1/166; G08G 1/167; G08G 1/04; G08G 1/162; G08G 1/165; H02P 29/032; H02P 25/22; H02P 27/06; H02P 29/028; H02P 29/024; H02P 29/0241; H02P 29/64; H02P 21/16; H02P 21/22; H02P 2201/07; H02P 23/14; H02P 27/08; H02P 27/085; H02P 29/68; H02P 3/18; H02P 3/22; H02P 5/74; H02P 6/17; H02P 6/18; B62D 5/0463; B62D 5/0481; B62D 5/0484; B62D 5/0487; B62D 13/06; B62D 15/025; B62D 5/0406; B62D 5/046; B62D 5/049; B62D 6/00; B62D 15/021; B62D 15/0255; B62D 15/026; B62D 15/0265; B62D 15/027; B62D 15/0285; B62D 1/184; B62D 1/187; B62D 15/10; B62D 25/12; B62D 29/007; B62D 5/04; B62D 5/0403; B62D 5/0409; B62D 5/043; B62D 5/0457; B62D 5/0496; B62D 5/063; B62D 6/005; B62D 6/10; Y02A 50/248; Y02A 50/2322

USPC ...... 340/457, 438, 425.5, 5.64, 5.6, 5.1, 5.2,
340/449, 457.1, 459
See application file for complete search history.

(56) References Cited

U.S. PATENT DOCUMENTS

| | | | | |
|---|---|---|---|---|
| 6,005,306 | A * | 12/1999 | Pickard | E05B 47/0047 |
| | | | | 307/117 |
| D433,645 | S | 11/2000 | Hanson | |
| 7,170,401 | B1 | 1/2007 | Cole | |
| 7,663,493 | B2 | 2/2010 | MOnzo | |
| 9,000,906 | B2 * | 4/2015 | Chavez | B60Q 1/00 |
| | | | | 180/271 |
| 9,014,920 | B1 * | 4/2015 | Torres | G08B 13/00 |
| | | | | 701/45 |
| 9,227,484 | B1 * | 1/2016 | Justice | B60N 2/002 |
| 9,384,647 | B1 | 7/2016 | Arnold | |
| 9,968,165 | B1 * | 5/2018 | Ramadhan | E05B 19/0082 |
| 2014/0015664 | A1 * | 1/2014 | Watson | G08B 21/24 |
| | | | | 340/457.1 |
| 2015/0332578 | A1 * | 11/2015 | Borgne | B60N 2/26 |
| | | | | 340/667 |
| 2017/0144595 | A1 | 5/2017 | Rovinsky | |

* cited by examiner

OCCUPANCY ALARM SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relate to alarm systems and more particularly pertains to a new alarm system for warning a driver of vehicle occupancy.

BRIEF SUMMARY OF THE INVENTION

An embodiment of the disclosure meets the needs presented above by generally comprising an electronics module that is configured to couple to a vehicle, and which is operationally couplable to an electronic control unit (ECU) and an electrical circuit of the vehicle. The electronics module comprises a module transceiver and a plurality of sensors, which is configured to determine an occupancy status of the vehicle. A fob device that is retained by a driver who exits the vehicle comprises a fob receiver, which is GPS enabled, a fob transceiver, and a speaker. CPU programming code that is positioned on a CPU of the ECU enables the ECU to selectively actuate the module transceiver, based on occupancy status of the vehicle and a position of the driver relative to the vehicle, to communicate an alert signal to the fob device via the fob transceiver to alert the driver to the occupancy status.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
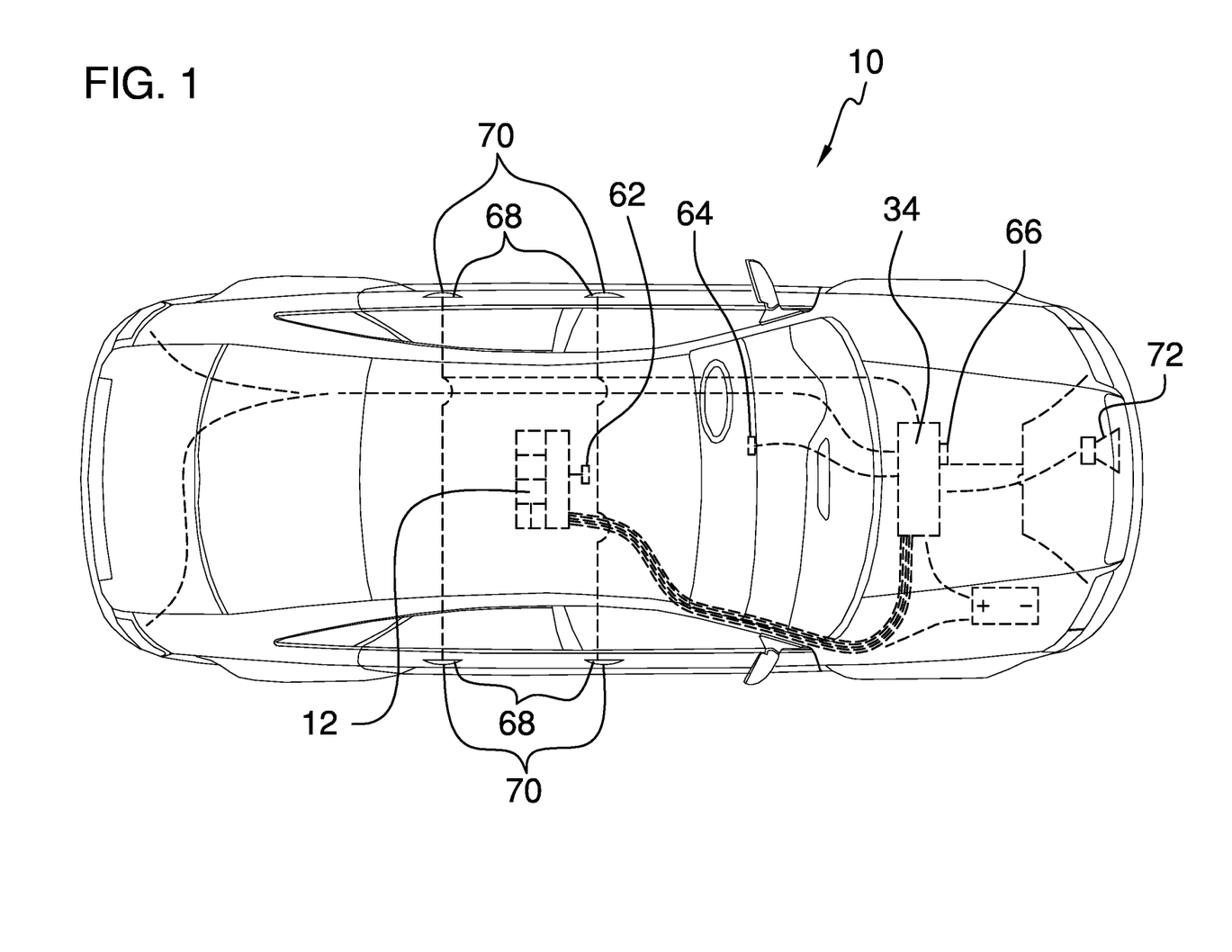
FIG. 1 is an in-use view of an occupancy alarm system according to an embodiment of the disclosure.
Figure 2:
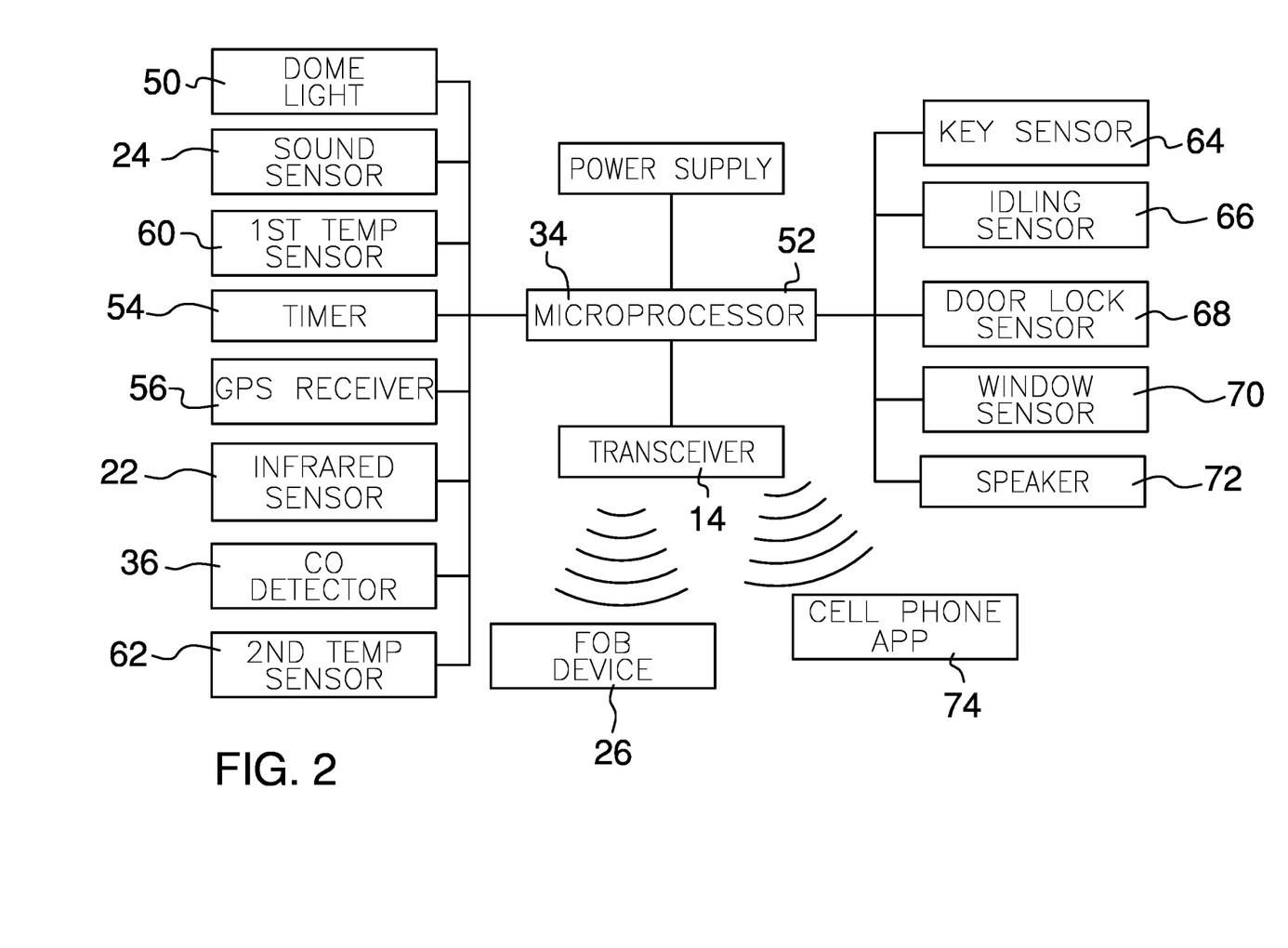
FIG. 2 is a block diagram of an embodiment of the disclosure.
Figure 3:
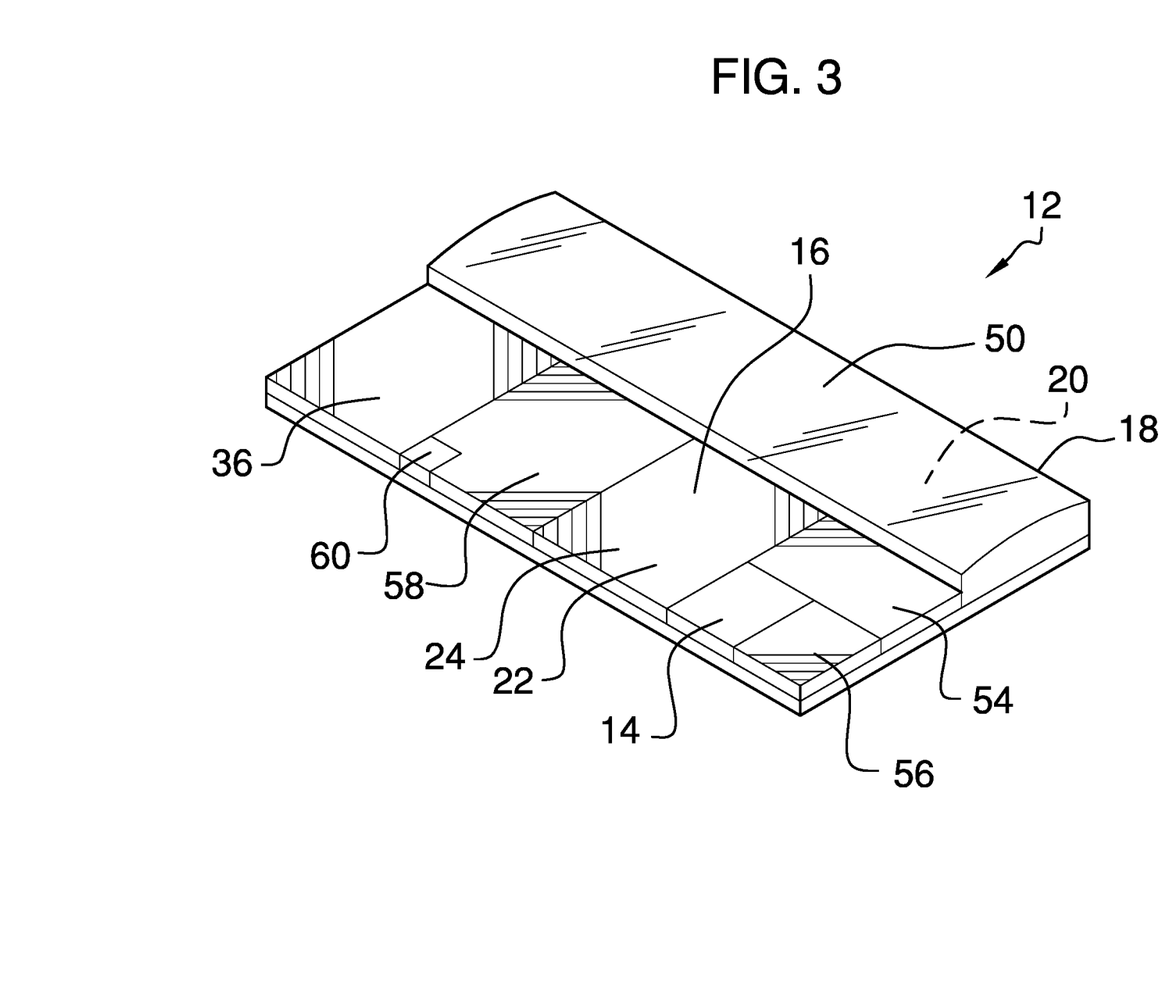
FIG. 3 is an isometric perspective view of an embodiment of the disclosure.
Figure 4:
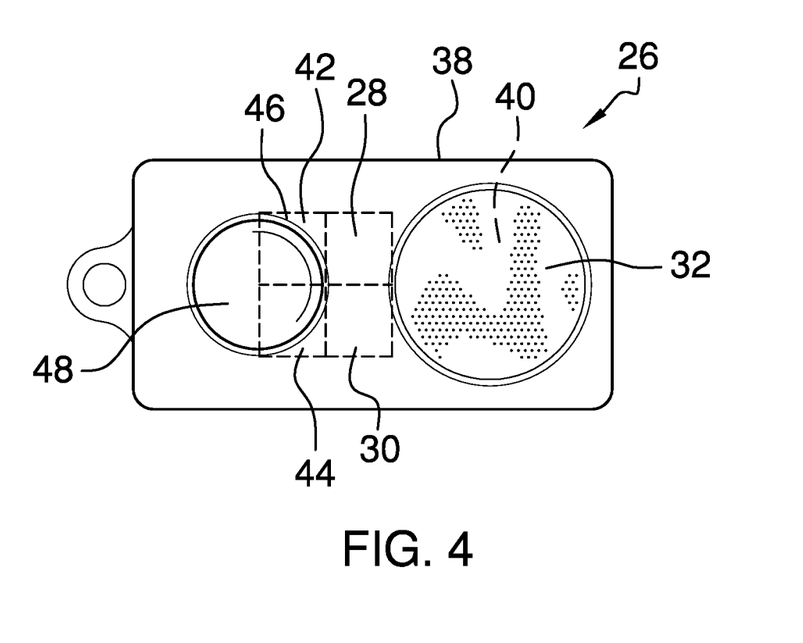
FIG. 4 is a top view of a fob device of an embodiment of the disclosure.

With reference now to the drawings, and in particular to FIGS. 1 through 4 thereof, a new alarm system embodying the principles and concepts of an embodiment of the disclosure and generally designated by the reference numeral 10 will be described.

As best illustrated in FIGS. 1 through 4, the occupancy alarm system 10 generally comprises an electronics module 12 that is configured to couple to an interior surface of a vehicle. The electronics module 12 is operationally couplable to an electronic control unit and an electrical circuit of the vehicle. The electronics module 12 comprises a module transceiver 14 and a plurality of sensors 16. The plurality of sensors 16 is configured to determine an occupancy status of the vehicle.

The electronics module 12 comprises a module housing 18 that defines an interior space 20. The module transceiver 14, an infrared sensor 22, and a transducer 24 are coupled to the module housing 18 and are positioned in the interior space 20. The infrared sensor 22 is configured to detect motion and body heat to determine the occupancy status of the vehicle. The transducer 24 is configured to convert sound into an electrical signal so that the transducer 24 is configured to detect sound that is produced by an occupant of the vehicle to determine the occupancy status of the vehicle.

The system 10 also comprises a fob device 26 that is coupled to an ignition key of the vehicle so that the fob device 26 is retained by a driver who exits the vehicle. The fob device 26 comprises a fob receiver 28, a fob transceiver 30, and a speaker 32. The fob receiver 28 is global positioning system enabled.

CPU programming code 34 that is positioned on a central processing unit of the electronic control unit enables the electronic control unit to selectively actuate the module transceiver 14, based on the occupancy status of the vehicle and a position of the driver relative to the vehicle, and to communicate an alert signal to the fob device 26 via the fob transceiver 30 so that an alert is broadcast via the speaker 32 to alert the driver to the occupancy status of the vehicle.

A detector 36 is coupled to the module housing 18 and is positioned in the interior space 20. The detector 36 is configured to determine a carbon monoxide level within a passenger compartment of the vehicle.

The fob device 26 comprises a fob housing 38 that defines an internal space 40. The fob receiver 28, the fob transceiver 30, a power module 42, and a fob microprocessor 44 are coupled to the fob housing 38 and are positioned in the internal space 40. The speaker 32 is coupled to the fob housing 38. The power module 42 comprises a battery 46. The fob microprocessor 44 is operationally coupled to the power module 42, the fob receiver 28, the fob transceiver 30, and the speaker 32. The fob receiver 28 is positioned to receive location coordinates that correspond to a location of the driver and to relay the location coordinates to the fob microprocessor 44. The fob microprocessor 44 is positioned to selectively actuate the speaker 32.

A button 48 that is coupled to the fob housing 38 is operationally coupled the fob microprocessor 44. The button 48 is configured to be depressed to signal the fob microprocessor 44 to deactivate the speaker 32, and, as discussed further below, to send a delay command to the electronics module 12.

A bulb 50 that is coupled to the module housing 18 is configured to selectively illuminate the passenger compartment of the vehicle. A module microprocessor 52, a timer 54, a module receiver 56, and a controller 58 are coupled to the module housing 18 and are positioned in the interior space 20. The CPU programming code 34 is positioned on the module microprocessor 52. The module microprocessor 52 is operationally coupled to the module transceiver 14, the infrared sensor 22, the transducer 24, the detector 36, the timer 54, the module receiver 56, the controller 58, and the bulb 50.

The timer 54 is positioned to selectively communicate an elapsed time to the module microprocessor 52. The module receiver 56 is Global Positioning System enabled and thus configured to receive location coordinates that correspond to a location of the vehicle and to relay the location coordinates to the module microprocessor 52.

A first temperature sensor 60 is coupled to the module housing 18. A second temperature sensor 62 is configured to be coupled to an exterior element of the vehicle. The first temperature sensor 60 and the second temperature sensor 62 are operationally coupled to the module microprocessor 52. The first temperature sensor 60 is configured to determine a temperature of the passenger compartment of the vehicle and to relay a temperature reading to the module microprocessor 52. The second temperature sensor 62 is configured to determine an ambient temperature and to relay an ambient temperature reading to the module microprocessor 52.

The controller 58 is operationally coupled to a heating, ventilation, and air conditioning unit of the vehicle so that the module microprocessor 52 is positioned to compare the temperature reading for the passenger compartment to the ambient temperature reading and to signal the controller 58. The controller 58 is configured to selectively actuate the heating, ventilation, and air conditioning unit to selectively heat and cool the passenger compartment so that the passenger compartment is maintained a safe temperature for an occupant.

A key sensor 64 that is operationally coupled to the module microprocessor 52 is configured to operationally couple to an ignition switch of the vehicle. The key sensor 64 is configured to determine whether the ignition key to the vehicle is inserted into the ignition switch and to signal the module microprocessor 52 as to the status of the ignition switch.

An idling sensor 66 that is operationally coupled to the module microprocessor 52 is configured to operationally couple to a crankshaft of the vehicle. The idling sensor 66 is configured to determine an idling state of the vehicle and to communicate the idling state to the module microprocessor 52, positioning the module microprocessor 52 to selectively actuate the controller 58 to selectively actuate the heating, ventilation, and air conditioning unit.

A plurality of door lock position sensors 68 is operationally coupled to the module microprocessor 52. Each door lock position sensor 68 is configured to be operationally coupled to a respective door lock of the vehicle. The door lock position sensor 68 is configured to determine a lock state of the respective door lock, positioning the module microprocessor 52 to selectively actuate the electronic control unit to unlock the respective door lock.

A plurality of window position sensors 70 is operationally coupled to the module microprocessor 52. Each window position sensor 70 is configured to be operationally coupled to a respective operable window of the vehicle. The window position sensor 70 is configured to determine a position of the respective operable window, positioning the module microprocessor 52 to selectively actuate the electronic control unit to reposition the respective operable window.

A loudspeaker 72 that is operationally coupled to the module microprocessor 52 is configured to couple to an engine compartment of the vehicle. The module microprocessor 52 is positioned to selectively actuate the loudspeaker 72 to broadcast an audio signal to an area proximate to the vehicle.

Alert programming code 74 that is positioned on an electronic device of the driver enables emulation of the fob device 26 on the electronic device. The emulation of the fob device 26 allows the driver to interact with the electronics module 12 using the electronic device.

As will be obvious to those skilled in the arts of vehicle electronic components, many of the components of the system 10 as described herein may be integral to the vehicle, or they may be selectively added to the vehicle, as required, as aftermarket modifications.

The CPU programming code 34 that is positioned either on the module microprocessor 52 or the central processing unit of the electronic control unit (if the system is integral to the vehicle) is anticipated to cover any foreseeable situation. By way of nonlimiting example of CPU programming code 34 and use of the system 10, four different scenarios are presented below.

In a first scenario wherein the vehicle is parked, the ignition is off, and both the doors and the windows are closed, if the plurality of sensors 16 does not detect occupancy, the CPU programming code 34 would direct the electronics module 12 to shut down after two minutes. Should the plurality of sensors 16 detect occupancy, the CPU programming code 34 would direct the timer 54 to initiate a countdown process. Once the driver is twenty feet away from vehicle, the CPU programming code 34 would direct the electronics module 12 to send a signal to the fob device 26 and to the electronic device of the driver to activate the speaker 32 to remind the driver that an occupant or pet remains in vehicle. A voice recording of the ambient temperature reading and temperature reading of the passenger compartment would be repeated every 10 seconds. The driver could press the button 48 on the fob device 26 or the button 48 as emulated on the electronic device to acknowledge the alert and to delay a broadcast from the loudspeaker 72 for 90 seconds. The pressing of the button 48 would delay the broadcast, but the pressing of the button 48 to delay the broadcast could only be performed once. The fob device 26 would continue to remind the driver every 10 seconds until the driver returns to vehicle. Should the driver not return with three minutes, the loudspeaker 72 would broadcast a loud and unique message, such as "Save Me", as well as an audible alarm, which would alert passersby of a potential emergency situation, such as a baby, a child, a senior, a disabled person, or a pet in the vehicle when the vehicle is dangerously hot, dangerously cold, or contains carbon monoxide.

Should the driver not return within three minutes and the temperature reading in the passenger compartment is dangerously high, the CPU programming code 34 would direct the electronic control unit to turn the vehicle engine on, to unlock all the doors, and to reposition all the operable windows to open positions. If the temperature reading in the passenger compartment is dangerously low, the CPU programming code 34 would direct the electronic control unit to turn the vehicle on, to unlock all the doors, and to reposition all the operable windows to closed positions. In this situation, the CPU programming code 34 would cause the vehicle will run for 15 minutes of every 30 minutes until disengaged by insertion of the ignition key into the ignition switch or until a signal from the fob device 26 is received by the electronics module 12. If the detector 36 detects carbon monoxide, the CPU programming code 34 would direct the electronic control unit to reposition all the operable windows to open positions.

In a second scenario, wherein the vehicle is parked, the vehicle engine is running, both the doors and the windows are closed, and the plurality of sensors 16 indicates occupancy, should the first temperature sensor 60 read a dangerously high or a dangerously low temperature in the passenger compartment, the CPU programming code 34 would direct the controller 58 to actuate the electronic control unit to selectively actuate the heating, ventilation, and air conditioning unit to maintain the passenger compartment at a safe temperature for the occupant. Should the driver not return with three minutes, the loudspeaker 72 would broadcast a loud and unique message, such as "Save Me", as well as an audible alarm, which would alert passersby of a potential emergency situation, such as a baby, a child, a senior, a disabled person, or a pet in the vehicle when the vehicle is dangerously hot, dangerously cold, or contains carbon monoxide. If the detector 36 detects carbon monoxide, the CPU programming code 34 would direct the electronic control unit reposition all the operable windows to open positions and to turn the vehicle engine off.

In a third scenario, wherein the vehicle is parked, the vehicle engine is either running or off, the doors and the windows are either open or closed, and the plurality of sensors 16 indicates no occupancy, the CPU programming code 34 would retain only the detector 36, the plurality of sensors 16, and the module receiver 56 in an active mode until either the vehicle engine is shut off, a vehicle door is opened, or the plurality of sensors 16 detects occupancy, at which point the timer 54 would be actuated.

In a fourth scenario, wherein the vehicle is in motion, the CPU programming code 34 would retain only the detector 36 and the module receiver 56 in an active mode. Should the detector 36 detect carbon monoxide, the CPU programming code 34 would direct the electronic control module to compel a speaker integral to the vehicle to broadcast an associated alarm and to flash the bulb 50 on and off until the driver pulls over to the side of road, removes the ignition key from the ignition switch, and exits the vehicle. The CPU programming code 34 also would signal the electronic control unit to reposition all the operable windows to open positions.

The system 10 is typically limited in activating alarms and safety features to when the driver is 25 feet or more distant to the vehicle. This to allow a driver to perform activities, such as filling a tank of the vehicle with gas, without "false" alarms or unwarranted activation of the safety features of the system 10. However, the plurality of sensors 16, the first temperature sensor 60, and the detector 36 still are monitoring the passenger compartment. Should the first temperature sensor 60 read a dangerously high or a dangerously low temperature in the passenger compartment, or the detector 36 detect carbon monoxide, the CPU programming code 34 will activate the safety features of the system 10. Additionally, if the vehicle is left with the air conditioning running in the summer or the heat running in the winter, only detection of carbon monoxide by the detector 36 would cause the CPU programming code 34 to activate the alarms and safety features of the system 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An occupancy alarm system comprising:
an electronics module configured for coupling to an interior surface of a vehicle, the electronics module being operationally couplable to an electronic control unit and an electrical circuit of the vehicle, the electronics module comprising a module transceiver and a plurality of sensors wherein the plurality of sensors is configured for determining an occupancy status of the vehicle;
a fob device coupled to an ignition key of the vehicle such that the fob device is retained by a driver exiting the vehicle, the fob device comprising a fob receiver, a fob transceiver, and a speaker, the fob receiver being global positioning system enabled;
CPU programming code positioned on a central processing unit of the electronic control unit enabling the electronic control unit for selectively actuating the module transceiver, based on the occupancy status of the vehicle and a position of the driver relative to the vehicle, for communicating an alert signal to the fob device via the fob transceiver such that an alert is broadcast via the speaker for alerting the driver to the occupancy status of the vehicle;
the electronics module comprising:

a module housing defining an interior space, the module transceiver being coupled to the module housing and positioned in the interior space, an infrared sensor coupled to the module housing and positioned in the interior space wherein the infrared sensor is configured for detecting motion and body heat for determining the occupancy status of the vehicle, and a transducer coupled to the module housing and positioned in the interior space, the transducer being configured for converting sound into an electrical signal wherein the transducer is configured for detecting sound produced by an occupant of the vehicle for determining the occupancy status of the vehicle; and the fob device comprising:

a fob housing defining an internal space, the fob receiver and the fob transceiver being coupled to the fob housing and positioned in the internal space, the speaker being coupled to the fob housing, a power module coupled to the fob housing and positioned in the internal space, a fob microprocessor coupled to the fob housing and positioned in the internal space, the fob microprocessor being operationally coupled to the power module, the fob receiver, the fob transceiver, and the speaker such that the fob receiver is positioned for receiving location coordinates corresponding to a location of the driver and for relaying the location coordinates to the fob microprocessor positioning the fob microprocessor for selectively actuating the speaker, and a button coupled to the fob housing, the button being operationally coupled the fob microprocessor wherein the button is configured for depressing for signaling the fob microprocessor for deactivating the speaker.

2. The system of claim 1, further including a detector coupled to the module housing and positioned in the interior space, the detector being configured for determining a carbon monoxide level within a passenger compartment of the vehicle.

3. The system of claim 2, further including the power module comprising a battery.

4. The system of claim 2, further including a module microprocessor coupled to the module housing and positioned in the interior space, the CPU programming code being positioned on the module microprocessor, the module microprocessor being operationally coupled to the module transceiver, the infrared sensor, the transducer, and the detector.

5. The system of claim 4, further including a bulb coupled to the module housing the bulb being operationally coupled to the module microprocessor wherein the bulb is configured for selectively illuminating the passenger compartment of the vehicle.

6. The system of claim 4, further including a timer coupled to the module housing and positioned in the interior space, the timer being operationally coupled to the module microprocessor such that the timer is positioned for selectively communicating an elapsed time to the module microprocessor.

7. The system of claim 4, further including a module receiver coupled to the module housing and positioned in the interior space, the module receiver being operationally coupled to the module microprocessor, the module receiver being Global Positioning System enabled wherein the module receiver is configured for receiving location coordinates corresponding to a location of the vehicle and for relaying the location coordinates to the module microprocessor.

8. The system of claim 4, further comprising:

a first temperature sensor coupled to the module housing, the first temperature sensor being operationally coupled to the module microprocessor wherein the first temperature sensor is configured for determining a temperature of the passenger compartment of the vehicle and for relaying a temperature reading to the module microprocessor;

a second temperature sensor configured for coupling to an exterior element of the vehicle, the second temperature sensor being operationally coupled to the module microprocessor wherein the second temperature sensor is configured for determining an ambient temperature and for relaying an ambient temperature reading to the module microprocessor; and a controller coupled to the module housing and positioned in the interior space, the controller being operationally coupled to the module microprocessor and to a heating, ventilation, and air conditioning unit of the vehicle such that the module microprocessor is positioned for comparing the temperature reading for the passenger compartment to the ambient temperature reading and for signaling the controller wherein the controller is configured for selectively actuating the heating, ventilation, and air conditioning unit for heating and cooling the passenger compartment such that the passenger compartment is maintained a safe temperature for an occupant.

9. The system of claim 8, further including an idling sensor operationally coupled to the module microprocessor, the idling sensor being configured for operationally coupling to a crankshaft of the vehicle wherein the idling sensor is configured for determining an idling state of the vehicle and for communicating the idling state to the module microprocessor positioning the module microprocessor for selectively actuating the controller for selectively actuating the heating, ventilation, and air conditioning unit.

10. The system of claim 4, further including a key sensor operationally coupled to the module microprocessor, the key sensor being configured for operationally coupling to an ignition switch of the vehicle wherein the key sensor is configured for determining whether the ignition key to the vehicle is inserted into the ignition switch and for signaling the module microprocessor as to the status of the ignition switch.

11. The system of claim 4, further including a plurality of door lock position sensors operationally coupled to the module microprocessor, each door lock position sensor being configured for operationally coupling to a respective door lock of the vehicle wherein the door lock position sensor is configured for determining a lock state of the respective door lock positioning the module microprocessor for selectively actuating the electronic control unit for unlocking the respective door lock.

12. The system of claim 4, further including a plurality of window position sensors operationally coupled to the module microprocessor, each window position sensor being configured for operationally coupling to a respective operable window of the vehicle wherein the window position sensor is configured for determining a position of the respective operable window positioning the module microprocessor for selectively actuating the electronic control unit for repositioning the respective operable window.

13. The system of claim 4, further including a loudspeaker operationally coupled to the module microprocessor, the loudspeaker being configured for coupling to an engine compartment of the vehicle wherein the module microprocessor is positioned for selectively actuating the loudspeaker for broadcasting an audio signal to an area proximate to the vehicle.

14. The system of claim 4, further including alert programming code positioned on an electronic device of the user enabling emulation of the fob device on the electronic device.

15. An occupancy alarm system comprising:
an electronics module configured for coupling to an interior surface of a vehicle, the electronics module being operationally couplable to an electronic control unit and an electrical circuit of the vehicle, the electronics module comprising a module transceiver and a plurality of sensors wherein the plurality of sensors is configured for determining an occupancy status of the vehicle, the electronics module comprising:
  a module housing defining an interior space, the module transceiver being coupled to the module housing and positioned in the interior space,
  an infrared sensor coupled to the module housing and positioned in the interior space wherein the infrared sensor is configured for detecting motion and body heat for determining the occupancy status of the vehicle,
  a transducer coupled to the module housing and positioned in the interior space, the transducer being configured for converting sound into an electrical signal wherein the transducer is configured for detecting sound produced by an occupant of the vehicle for determining the occupancy status of the vehicle, and
  a detector coupled to the module housing and positioned in the interior space, the detector being configured for determining a carbon monoxide level within a passenger compartment of the vehicle;
a fob device coupled to an ignition key of the vehicle such that the fob device is retained by a driver exiting the vehicle, the fob device comprising a fob receiver, a fob transceiver, and a speaker, the fob receiver being global positioning system enabled, the fob device comprising:
  a fob housing defining an internal space, the fob receiver and the fob transceiver being coupled to the fob housing and positioned in the internal space, the speaker being coupled to the fob housing,
  a power module coupled to the fob housing and positioned in the internal space, the power module comprising a battery,
  a fob microprocessor coupled to the fob housing and positioned in the internal space, the fob microprocessor being operationally coupled to the power module, the fob receiver, the fob transceiver, and the speaker such that the fob receiver is positioned for receiving location coordinates corresponding to a location of the driver and for relaying the location coordinates to the fob microprocessor positioning the fob microprocessor for selectively actuating the speaker, and
  a button coupled to the fob housing, the button being operationally coupled the fob microprocessor wherein the button is configured for depressing for signaling the fob microprocessor for deactivating the speaker;

CPU programming code positioned on a central processing unit of the electronic control unit enabling the electronic control unit for selectively actuating the module transceiver, based on the occupancy status of the vehicle and a position of the driver relative to the vehicle, for communicating an alert signal to the fob device via the fob transceiver such that an alert is broadcast via the speaker for alerting the driver to the occupancy status of the vehicle;
a module microprocessor coupled to the module housing and positioned in the interior space, the CPU programming code being positioned on the module microprocessor, the module microprocessor being operationally coupled to the module transceiver, the infrared sensor, the transducer, and the detector;
a bulb coupled to the module housing, the bulb being operationally coupled to the module microprocessor wherein the bulb is configured for selectively illuminating the passenger compartment of the vehicle;
a timer coupled to the module housing and positioned in the interior space, the timer being operationally coupled to the module microprocessor such that the timer is positioned for selectively communicating an elapsed time to the module microprocessor;
a module receiver coupled to the module housing and positioned in the interior space, the module receiver being operationally coupled to the module microprocessor, the module receiver being Global Positioning System enabled wherein the module receiver is configured for receiving location coordinates corresponding to a location of the vehicle and for relaying the location coordinates to the module microprocessor;
a first temperature sensor coupled to the module housing, the first temperature sensor being operationally coupled to the module microprocessor wherein the first temperature sensor is configured for determining a temperature of the passenger compartment of the vehicle and for relaying a temperature reading to the module microprocessor;
a second temperature sensor configured for coupling to an exterior element of the vehicle, the second temperature sensor being operationally coupled to the module microprocessor wherein the second temperature sensor is configured for determining an ambient temperature and for relaying an ambient temperature reading to the module microprocessor;
a controller coupled to the module housing and positioned in the interior space, the controller being operationally coupled to the module microprocessor and to a heating, ventilation, and air conditioning unit of the vehicle such that the module microprocessor is positioned for comparing the temperature reading for the passenger compartment to the ambient temperature reading and for signaling the controller wherein the controller is configured for selectively actuating the heating, ventilation, and air conditioning unit for heating and cooling the passenger compartment such that the passenger compartment is maintained a safe temperature for an occupant;
a key sensor operationally coupled to the module microprocessor, the key sensor being configured for operationally coupling to an ignition switch of the vehicle wherein the key sensor is configured for determining whether the ignition key to the vehicle is inserted into the ignition switch and for signaling the module microprocessor as to the status of the ignition switch;

an idling sensor operationally coupled to the module microprocessor, the idling sensor being configured for operationally coupling to a crankshaft of the vehicle wherein the idling sensor is configured for determining an idling state of the vehicle and for communicating the idling state to the module microprocessor positioning the module microprocessor for selectively actuating the controller for selectively actuating the heating, ventilation, and air conditioning unit;

a plurality of door lock position sensors operationally coupled to the module microprocessor, each door lock position sensor being configured for operationally coupling to a respective door lock of the vehicle wherein the door lock position sensor is configured for determining a lock state of the respective door lock positioning the module microprocessor for selectively actuating the electronic control unit for unlocking the respective door lock;

a plurality of window position sensors operationally coupled to the module microprocessor, each window position sensor being configured for operationally coupling to a respective operable window of the vehicle wherein the window position sensor is configured for determining a position of the respective operable window positioning the module microprocessor for selectively actuating the electronic control unit for repositioning the respective operable window;

a loudspeaker operationally coupled to the module microprocessor, the loudspeaker being configured for coupling to an engine compartment of the vehicle wherein the module microprocessor is positioned for selectively actuating the loudspeaker for broadcasting an audio signal to an area proximate to the vehicle; and alert programming code positioned on an electronic device of the user enabling emulation of the fob device on the electronic device.

\* \* \* \* \*